United States Patent
Savonnet et al.

(10) Patent No.: US 10,584,224 B2
(45) Date of Patent: Mar. 10, 2020

(54) THERMOSET POLYESTER FOAMS AND MANUFACTURING METHOD

(71) Applicant: SAINT-GOBAIN ISOVER, Courbevoie (FR)

(72) Inventors: Marie Savonnet, Paris (FR); Edouard Obert, Fleurines (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 194 days.

(21) Appl. No.: 15/580,492

(22) PCT Filed: Jun. 15, 2016

(86) PCT No.: PCT/FR2016/051446
§ 371 (c)(1),
(2) Date: Dec. 7, 2017

(87) PCT Pub. No.: WO2016/207517
PCT Pub. Date: Dec. 29, 2016

(65) Prior Publication Data
US 2018/0171090 A1    Jun. 21, 2018

(30) Foreign Application Priority Data

Jun. 24, 2015 (FR) .................... 15 55789

(51) Int. Cl.
| | |
|---|---|
| *C08J 9/06* | (2006.01) |
| *C08J 9/228* | (2006.01) |
| *C08G 63/60* | (2006.01) |
| *C08G 63/06* | (2006.01) |
| *C08J 9/00* | (2006.01) |
| *C08J 9/08* | (2006.01) |
| *B29C 44/02* | (2006.01) |
| *B29C 44/34* | (2006.01) |
| *B29K 67/00* | (2006.01) |
| *B29K 105/00* | (2006.01) |
| *B29K 105/04* | (2006.01) |

(52) U.S. Cl.
CPC ................ *C08J 9/06* (2013.01); *B29C 44/02* (2013.01); *B29C 44/3415* (2013.01); *B29C 44/355* (2013.01); *C08G 63/06* (2013.01); *C08G 63/60* (2013.01); *C08J 9/0023* (2013.01); *C08J 9/0028* (2013.01); *C08J 9/0033* (2013.01); *C08J 9/0038* (2013.01); *C08J 9/08* (2013.01); *C08J 9/228* (2013.01); *B29K 2067/00* (2013.01); *B29K 2105/0002* (2013.01); *B29K 2105/0014* (2013.01); *B29K 2105/046* (2013.01); *B29K 2995/0063* (2013.01); *C08J 2203/02* (2013.01); *C08J 2203/12* (2013.01); *C08J 2205/04* (2013.01); *C08J 2205/052* (2013.01); *C08J 2300/24* (2013.01); *C08J 2367/00* (2013.01); *C08J 2367/02* (2013.01)

(58) Field of Classification Search
CPC ... B29C 44/02; B29C 44/3415; B29C 44/355; C08G 63/06; C08G 63/60; C08J 9/0023; C08J 9/0028; C08J 9/0033; C08J 9/0038; C08J 9/06; C08J 9/08; C08J 9/228; C08J 2203/02; C08J 2203/12; C08J 2205/04; C08J 2205/052; C08J 2300/24; C08J 2367/00; C08J 2367/02; B29K 2067/00; B29K 2105/0002; B29K 2105/0014; B29K 2105/046; B29K 2995/0063
See application file for complete search history.

(56) References Cited

U.S. PATENT DOCUMENTS

| | | | | |
|---|---|---|---|---|
| 5,480,963 | A * | 1/1996 | Jiang | ............... A61L 17/08 424/78.37 |
| 2011/0224323 | A1 | 9/2011 | Bigwood et al. | |
| 2013/0266788 | A1* | 10/2013 | Alberts | ................. C08G 63/12 428/220 |
| 2015/0005403 | A1 | 1/2015 | Rothenberg et al. | |

FOREIGN PATENT DOCUMENTS

| | | |
|---|---|---|
| EP | 2628757 A1 | 8/2013 |
| WO | 2010/059925 A1 | 5/2010 |

OTHER PUBLICATIONS

International Search Report dated Sep. 9, 2016, in PCT/FR2016/051446 filed Jun. 15, 2016.

* cited by examiner

*Primary Examiner* — Irina S Zemel

(74) *Attorney, Agent, or Firm* — Oblon, McClelland, Maier & Neustadt, L.L.P.

(57) ABSTRACT

A process for manufacturing a thermoset polyester foam includes the following successive steps: (a) providing an expandable and thermosetting composition containing a polyol component including at least one element selected from glycerol, diglycerol and glycerol oligomers; a polyacid component including citric acid; a surfactant selected from alkyl polyglycosides and mixtures of an anionic surfactant and a cationic surfactant, and an esterification catalyst; (b) introducing the expandable and thermosetting composition into a mold or applying the expandable composition to a support; and (c) heating the expandable and thermosetting composition at a temperature at least equal to 135° C. so as to react the polyol component with the polyacid component and form a block of thermoset polyester foam.

16 Claims, 1 Drawing Sheet

THERMOSET POLYESTER FOAMS AND MANUFACTURING METHOD

CROSS-REFERENCE TO RELATED APPLICATIONS

The present application is a 35 U.S.C. § 371 national stage patent application of International patent application PCT/FR2016/051446, filed on Jun. 15, 2016, the text of which is incorporated by reference, and claims the benefit of the filing date of French application no. 1555789, filed on Jun. 24, 2015, the text of which is also incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The present invention relates to solid thermoset foams obtained by chemical reaction and foaming of an expandable composition containing a polyol component, a polyacid component, a surfactant and an esterification catalyst.

Description of the related art including information disclosed under 37 CFR 1.97 and 1.98

It is known to prepare thermoset polyester foams by reaction of a polyol and of a polyacid.

In application WO 2010/059925, a highly crosslinked polyester is obtained in two steps: the first step consists in forming a non-crosslinked prepolymer by reaction of a polyol and of a polyacid at a first relatively low temperature and the second step in crosslinking the prepolymer either at a second temperature higher than the first, or at a moderate temperature in the presence of a crosslinking agent or a polymerization (esterification) catalyst. The absence of the catalyst in the first step appears to be essential for being able to carry, out this process in two steps.

Certain cured polymers are described as foams. Their density is however relatively high (Example 12: 350 kg/m$^3$; Example 16: 190 kg/m$^3$). The use of physical or chemical foaming agents is envisaged (see [0040]).

International application WO 2012/052385 describes an expanded polymer obtained by reaction of glycerol and citric acid at a temperature between 80 and 130° C. until the degree of conversion is at least equal to 90%, optionally in the presence of an esterification catalyst. When a degree of conversion of at least 90%, preferably 98%, is achieved, the reaction mixture is heated at a higher temperature, close to 150° C. The first step at low temperature is intended to avoid, insofar as possible, the decarboxylation of the citric acid.

The process described in this document requires very long reaction times, ranging from several hours to several tens of hours. The polymerization is preferably carried out in non-stick molds, for example made of Teflon. The foams thus obtained have a density of between 200 and 850 g/liter.

International application WO 2013/121033 describes an improvement of this process where the polymerization of glycerol and citric acid is carried out in contact with a substrate with an outer layer comprising at least a metal, a metal oxide or a metal halide. This process provides foams having a more regular pore size than those prepared by the process described in WO 2012/052385. The densities claimed are between 50 and 850 g/liter. The foams prepared in the examples according to the invention have densities between 282 g/liter and 482 g/liter.

BRIEF SUMMARY OF THE INVENTION

The present invention is based on the discovery that the use of an esterification catalyst and of a surfactant in the initial reaction mixture containing glycerol and citric acid made it possible to obtain, in a single polymerization step, carried out at high temperature and in a limited time, foams of excellent quality having a lower density than the known foams and having a fine and uniform porosity.

DETAILED DESCRIPTION OF THE INVENTION

Figure 1:
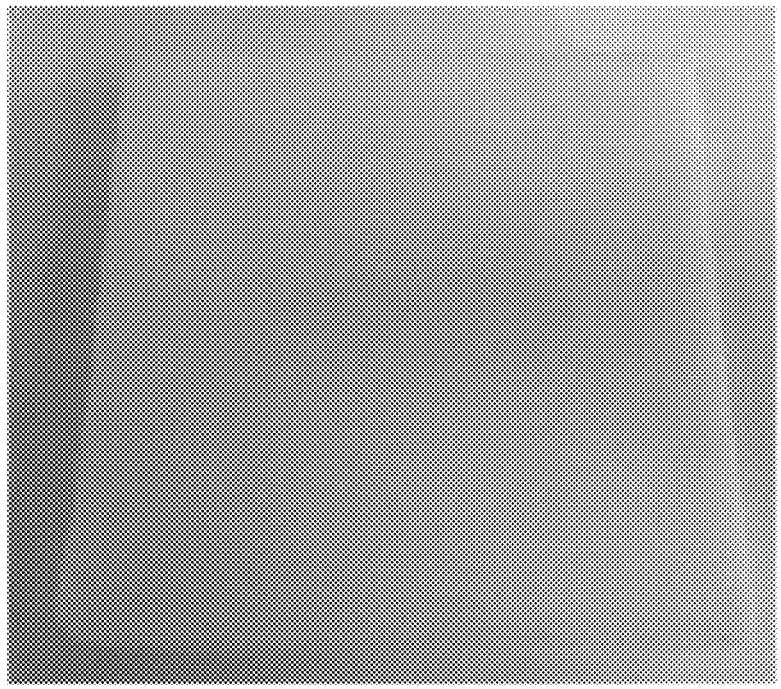
FIG. 1 shows a slab of foam obtained in accordance with the present invention.

In the process of the present invention, the applicant does not in any way seek to avoid the decomposition of the citric acid to give aconitic acid and $CO_2$. On the contrary, the reaction medium is heated rapidly at a high temperature in order to use the citric acid as a chemical pore-forming agent (chemical blowing agent, chemical foaming agent) that makes the addition of a physical pore-forming agent superfluous.

One subject of the present invention is therefore a process for manufacturing a thermoset polyester foam, comprising the following successive steps:

(a) providing an expandable and thermosetting composition containing
    a polyol component comprising at least one element selected from glycerol, diglycerol and glycerol oligomers,
    a polyacid component comprising citric acid,
    a surfactant, and
    an esterification catalyst, (b) introducing the expandable and thermosetting composition into a mold or applying the expandable composition to a support, (c) heating the expandable and thermosetting composition at a temperature at least equal to 135° C., preferably at least equal to 150° C., more preferentially still at least equal to 175° C., so as to react the polyol component with the polyacid component and form a block of thermoset polyester foam.

Another subject of the invention is the use of a composition containing
- a polyol component comprising at least one element selected from glycerol, diglycerol and glycerol oligomers,
- a polyacid component comprising citric acid,
- a surfactant, and
- an esterification catalyst, as expandable and thermosetting composition for the manufacture of an insulating product of foam type.

The expandable thermosetting composition therefore comprises four essential components: the polyol component, the polyacid component, the surfactant and the esterification catalyst.

The polyacid component may comprise polyacids other than citric acid and the polyol component may comprise polyols, that is to say polyhydroxylated compounds, other than glycerol, diglycerol and glycerol oligomers. Examples of other polyacids and polyols will be given below.

In the present application the amounts or contents of polyol or polyacid components are always understood as meaning for all of the polyols or for all of the polyacids present in the composition.

This definition of the polyol and polyacid components does not exclude the possibility that certain surfactants are considered to fall within the polyol or polyacid components. This is the case for example for alkyl polyglycosides (APGs) which fall within the preferred surfactants. Alkyl polyglycosides comprise one or more sugar units (polyhydroxylated units) and act both as a surfactant by adjusting and controlling the porosity of the foams obtained, and as polyols capable of participating in the formation of a cured three-dimensional network by reaction with the acid groups of the polyacid component.

In the present invention when a compound, present in the expandable and thermosetting composition, can be considered both to be a first of the four essential components and to be a second of the four essential components of the composition (polyol component, polyacid component, surfactant, esterification catalyst) it will be considered to be both one and the other. This means that it will be taken into account in the amounts of each of these two components.

Thus, an expandable and thermosetting composition containing
- 48% by weight of glycerol,
- 47% by weight of citric acid,
- 3% by weight of alkyl polyglycosides and
- 2% by weight of an esterification catalyst will have a polyol component content equal to 51% (48% glycerol+3% alkyl polyglycoside), a polyacid component content equal to 47%, a surfactant content equal to 3% and an esterification catalyst content equal to 2%. The numerical sum of these four components is then of course greater than 100% since the 3% alkyl polyglycosides are counted twice.

Certain alkylphosphonic acids (R—PO$_4$H$_2$ were R is a fatty chain) constitute another example of an ingredient that, can play two roles, namely the role of a surfactant and that of an esterification catalyst.

The first essential component of the expandable composition is the polyol component. This component comprises at least one element selected from the group formed by glycerol, diglycerol and oligoglycerols. Compounds of formula:

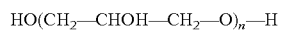

HO(CH$_2$—CHOH—CH$_2$—O)$_n$—H          (1)

where n is an integer between 3 and 6, and the aliphatic monoethers or polyethers of the compounds of formula (1) in which up to 30% of the —OH functions may be etherified by aliphatic alcohols, are considered to be oligoglycerols.

The polyol component preferably comprises, relative to the total dry weight of the polyol component, at least 15% by weight, preferably at least 20% by weight, in, particular at least 25% by weight of glycerol. The Applicant has indeed observed that a large amount of glycerol monomer makes it possible to obtain foams of low density and of uniform porosity.

The polyol component preferably contains at most 30% by weight, in, particular at most 20% by weight and ideally at most 10% by weight, relative to the total dry weight of the polyol component, of polyols that are neither glycerol, nor diglycerol nor glycerol oligomers.

These polyols are preferably biobased polyols, in particular sugars and alcohols of sugars (hydrogenated sugars).

The sugars that can be used as part of the polyol component may be reducing sugars or non-reducing sugars.

The term "reducing sugars" is understood to mean the carbohydrates of formula $C_n(H_2O)_p$ having at least one aldehyde or ketone group (reducing group). The reducing sugars that can be used in the present invention encompass monosaccharides and polysaccharides (disaccharides, oligosaccharides and polysaccharides proper).

Mention may be made, as examples of monosaccharides, of those comprising from 3 to 8 carbon atoms, preferably aldoses and advantageously aldoses containing from 5 to 7 carbon atoms. The aldoses that are particularly preferred are natural aldoses (belonging to the D series), in particular hexoses, such as glucose, mannose and galactose.

Lactose or maltose are examples of disaccharides that can be used as, reducing sugars.

Use may also advantageously be made of starch hydrolysates obtained by enzymatic hydrolysis or acid hydrolysis of starch.

The non-reducing sugars that can be used are saccharose and trehalose.

As examples of hydrogenated sugars, mention may be made of erythritol, arabitol, xylitol, sorbitol, mannitol, iditol, maltitol, isomaltitol, lactitol, cellobiitol, palatinitol, maltotriitol and the hydrogenation products of starch hydrolysates.

The second essential component of the expandable composition is the polyacid component. The polyacid component preferably comprises at least 50% by weight, in particular at least 65% by weight and ideally at least 80% by weight of citric acid, relative to the total weight of the polyacid component.

Other polyacids capable of reacting with the polyol component in order to form a polyester network may be present. These other polyacids are preferably polyacid monomers, in other words polyacids that are not formed by polymerization of monomer units bearing acid groups such as poly(acrylic acid).

The other polyacids are preferably polycarboxylic acids, for example dicarboxylic, tricarboxylic or tetracarboxylic acids.

The dicarboxylic acids encompass, for example, oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and derivatives thereof, in particular those containing at least one boron or chlorine atom, tetrahydrophthalic acid and derivatives thereof, in particular those containing at least one chlorine atom, such as chlorendic acid, isophthalic acid, terephthalic acid, mesaconic acid and citraconic acid.

The tricarboxylic acids encompass, for example, tricarballylic acid, 1,2,4-butanetricarboxylic acid, aconitic acid, hemimellitic acid, trimellitic acid and trimeric acid.

Mention may be made, as tetracarboxylic acid, for example, of 1,2,3,4 butanetetracarboxylic acid and pyromellitic acid.

The polyol and polyacid components as defined above represent, together, at least 60%, preferably at least 70% and in particular at least 80% of the dry weight of the expandable and thermosetting composition.

The polyol component represents preferably from 15% to 60% by weight, in particular from 20% to 50% by weight and ideally from 25% to 45% by weight of the total weight of the polyol and polyacid components. It follows logically therefrom that the polyacid component represents preferably from 40% to 85% by weight, in particular from 50% to 80% by weight, and ideally from 55% to 75% by weight of the total weight of the polyol and polyacid components.

In a known manner, the respective amounts of the polyol and polyacid components will be adjusted so that the —OH functions and the —COOH functions are present in a molar ratio of between 0.65 and 1.5, preferably between 0.8 and 1.4, in particular between 1.0 and 1.3.

The third essential component of the expandable and thermosetting composition is a surfactant. In the present application, this term also encompasses mixtures of several surfactants.

The role of this ingredient is to improve the quality of the foam, that is to say to reduce the pore size, to narrow the pore size distribution and reduce the density of the cured foams obtained.

The surfactant preferably has a hydrophilic-lipophilic balance (HLB) of between 3 and 13, preferably between 5 and 8.

In one embodiment, the surfactant is a mixture of an anionic surfactant and of a cationic surfactant. In the field of liquid aqueous foams, it is known that a combination of two types of surfactants having opposite charges makes it possible to stabilize the film of surfactants at the water/air interface by reducing the repulsion between molecules having the same charge. As will be demonstrated below in the examples, the Applicant obtained excellent results with a mixture of sodium dodecyl sulfate (SDS) and tetradecyltrimethylammonium bromide (TTAB) and the use of a combination of these two surfactants therefore constitutes a preferred embodiment. The TTAB/SDS weight ratio is preferably between 1.5 and 2.5, in particular between 1.8 and 2.2 and ideally close to 2.

Nonionic surfactants constitute an interesting alternative to the combination of an anionic surfactant and of a cationic surfactant. Indeed, for nonionic surfactants there are no repulsive forces between hydrophilic heads having the same charge and certain nonionic surfactants are therefore particularly suitable for the formation of good quality, foams. The nonionic surfactants used in the present invention preferably have an HLB of between 3 and 13.

This is the case, for example, for alkyl polyglycosides (APGs) which are molecules comprising a hydrophilic head formed from one or more sugar units, grafted by an alkyl fatty chain.

The alkyl polyglycosides preferably comprise between 1 and 2 glucoside units and the alkyl chains preferably comprise from 8 to 14 carbon atoms and are preferably linear alkyl chains.

Mention may be made, as examples of alkyl polyglycosides, of products of the Glucopon brand, in particular Glucopon 600 CSUP (laury glucoside) and Glucopon 650 EC (coco glucoside).

The amount of surfactant advantageously represents from 0.1% to 10%, preferably from 1% to 8% and in particular from 2% to 6% of the total dry weight of the expandable composition.

The fourth essential ingredient of the expandable and thermosetting composition used in the process of the present invention is an esterification catalyst. This catalyst is preferably, but not necessarily, a phosphorus-containing compound. Mention may be made, as examples of preferred, phosphorus-based catalysts, of those selected from the group consisting of alkali metal hypophosphite ($H_2PO_2M$), alkali metal phosphite ($HPO_3M_2$), alkali metal polyphosphate ($M_3PO_4$), alkali metal hydrogen phosphate ($M_2HPO_4$), phosphoric acid ($H_3PO_4$), alkylphosphonic acid ($RPO_3H_2$) and a mixture of two or more of these compounds. Alkali metal hypophosphite is particularly preferred.

The concentration of the esterification catalyst is typically between 0.1% and 10% by weight, preferably between 1% and 8% by weight, and in particular from 2% to 6% by weight, relative to the dry weight of the expandable composition.

The mixture of the four essential components described above is advantageously a solution. In order to dissolve all of the ingredients, it may be useful to add a certain amount of water. The water may also serve to thin the composition in order to facilitate the flow thereof or the spreading thereof during step (b) of the process of the invention. However, it, will generally be sought to limit the amount of water in the expandable composition since the esterification reaction will only begin after complete evaporation of the water and the evaporation of the water has an undesirable energy cost.

The expandable composition will therefore advantageously contain at most 60% by weight, preferably at most 25% by weight, more preferentially at most 15% by weight and in particular at most 5% by weight of water, relative to the total weight of the expandable composition.

The expandable composition used in the present invention may also contain up to 30% by weight, preferably up to 20% by weight, in particular up to 10% by weight, relative to the dry weight of the total expandable composition, of one or more inorganic or organic fillers.

Finally, the expandable composition may contain one or more other additives conventionally used in the industry for the processing and transformation of polymers, such as dyes, pigments, antibacterial or antifungal agents, flame retardants, UV absorbers or hydrophobic agents. These additives represent, in total, preferably at most 10% of the dry weight of the composition.

Although the expandable composition can, in principle, contain an organic blowing agent such as pentane, it is important to note that it is not necessary to add one.

This is because citric acid, present in the polyacid component, acts as, a blowing agent. When the expandable composition is heated, in step (c), at a temperature close to 175° C., the citric acid decomposes, in a known manner, to give aconitic acid and $CO_2$ (M. M. Barbooti et al., "Thermal Decomposition of Citric Acid", Thermochimica Acta, 98 (1986), 119-126; D. Wyrzykowski et al., "Thermal Behavior of Citric Acid and Isomeric Aconitic Acids", J. Therm. Anal. Calorim. (2001), 104: 731-735). It will be shown below in the exemplary embodiments that foams of good quality and low density may be obtained in the absence of any physical blowing agent. When step (c) is carried out at a temperature above 170° C., the addition of an organic blowing agent is therefore superfluous. In one preferred embodiment of the process of the present invention, the expandable composition is therefore essentially free of organic physical blowing agent.

When the expandable composition is spread in the form of a continuous film on a support, the thickness of the film, before heating, that is to say before expansion and curing, is advantageously at least equal to 1 mm, preferably at least equal to 2 mm, in particular at least equal to 5 mm, and more preferentially at least equal to 10 mm.

The volume of the foam block formed may vary between very wide limits. When the expandable composition is used in a continuous process forming, for example, strips or profiled elements of insulating materials, it is potentially infinite. When the expandable composition is used to form separate blocks, for example slabs or sheets of foams, its amount is preferably such that the volume of each block of thermoset solid foam is at least equal to 500 cm$^3$, preferably at least equal to 0.001 m$^3$, in particular at least equal to 0.01 m$^3$.

The block of foam is preferably in the form of a slab.

Use may in principle be made, in order to heat the expandable composition in step (c), of any standard means known in the field of the processing and transformation of polymers, such as hot air, thermal radiation, microwaves or bringing into contact with a hot support (mold).

Of course, the temperature of the heating means (drying oven, support, mold) can be greater than the abovementioned reaction temperature, for example between 160 and 210° C.

The duration of the heating step (step (c)) depends not only on the temperature, but also on the heating means and on the volume/surface ratio of the block of foam formed. It is generally between 10 minutes and 5 hours, preferably between 20 minutes and 4 hours and in particular between 30 minutes and 3 hours.

Another subject of the present invention is a solid polyester foam capable of being obtained by the process that is the subject of the present invention.

In the absence of added dyes, the solid foams prepared by the process of the invention are generally of light color, typically of ivory, yellow or beige color. Their density is between 20 and 80 kg/m$^3$, preferably between 25 and 50 kg/m$^3$, in particular between 27 and 48 kg/m$^3$.

They have a closed porosity with a mean diameter of the pores, determined by X-ray tomography, of between 100 and 800 μm.

EXAMPLES

Several expandable and thermosetting compositions are prepared by adding powdered citric acid to an aqueous solution containing glycerol, diglycerol, oligoglycerol or a mixture thereof. Added next are the esterification catalyst (sodium hypophosphite monohydrate) in powder form, and then the surfactant, and the solids content of the mixture is adjusted to 66% by weight. The mixture is stirred at ambient temperature until the citric acid powder has dissolved. Table 1 indicates the respective amounts of the ingredients used, expressed as dry matter, and also the total solids content of the compositions obtained.

The reactive solution is then poured into rectangular molds, the bottom of which is covered with a sheet of aluminum. The thickness of the liquid film is around 1 mm. The molds are heated for 3 hours in a ventilated drying oven thermostated at 180° C.

After removing the molds from the drying oven and cooling the foams formed to ambient temperature, the thickness of the foam formed is evaluated with the aid of the following rating scale:

−: less than 0.5 cm

+: 0.5 to 1 cm

++: 1.1 to 2 cm

+++: 2.1 to 3 cm

++++: 3.1 to 4 cm

+++++: more than 4 cm

TABLE 1

| Polyol | Polyacid | Catalyst | Surfactant | Solids content | Thickness of the foam |
|---|---|---|---|---|---|
| 34 parts of glycerol | 66 parts of citric acid | 5 parts of HPS* | 5.1 parts of TTAB/SDS** | 66% | +++++ |
| 42 parts of a glycerol & diglycerol & oligoglycerol mixture*** | 58 parts of citric acid | 5 parts of HPS* | 5.1 parts of TTAB/SDS** | 66% | +++++ |
| 41 parts of diglycerol | 59 parts of citric acid | 5 parts of HPS* | 5.1 parts of TTAB/SDS** | 66% | +++ |
| 41 parts of oligoglycerol**** | 59 parts of citric acid | 5 parts of HPS* | 5.1 parts of TTAB/SDS** | 66% | ++ |
| 34 parts of glycerol | 66 parts of citric acid | 5 parts of HPS* | 2.55 parts of TTAB/SDS** | 66% | +++++ |
| 34 parts of glycerol | 66 parts of citric acid | 5 parts of HPS* | 5 parts of (C$_8$-C$_{14}$)alkyl polyglycoside | 66% | +++++ |
| 34 parts of glycerol | 66 parts of citric acid | 5 parts of HPS* | 2.5 parts of (C$_8$-C$_{14}$)alkyl polyglycoside + 2.55 parts of TTAB/SDS** | 66% | +++++ |
| 34 parts of glycerol | 66 parts of citric acid | 10 parts of HPS* | (C$_8$-C$_{14}$)alkyl polyglycoside + 2.55 parts of TTAB/SDS** | 66% | +++++ |
| 42 parts of a glycerol & diglycerol & oligoglycerol mixture*** | 58 parts of citric acid | 5 parts of HPS* | 2.5 parts of (C$_8$-C$_{14}$)alkyl polyglycoside | 66% | +++ |

TABLE 1-continued

| Polyol | Polyacid | Catalyst | Surfactant | Solids content | Thickness of the foam |
|---|---|---|---|---|---|
| 42 parts of a glycerol & diglycerol & oligoglycerol mixture*** | 58 parts of citric acid | 5 parts of HPS* | 3.75 parts of (C$_8$-C$_{14}$)alkyl polyglycoside | 66% | +++++ |
| 42 parts of a glycerol & diglycerol & oligoglycerol mixture*** | 58 parts of citric acid | 5 parts of HPS* | 5 parts of (C$_{12}$-C$_{14}$)alkyl polyglycoside | 66% | +++++ |
| 42 parts of a glycerol & diglycerol & oligoglycerol mixture*** | 58 parts of citric acid | 5 parts of HPS* | 7.5 parts of (C$_{12}$-C$_{14}$)alkyl polyglycoside | 66% | +++++ |
| 42 parts of a glycerol & diglycerol & oligoglycerol mixture*** | 58 parts of citric acid | 5 parts of HPS* | 7.65 parts of TTAB/SDS** | 66% | +++++ |
| 42 parts of a glycerol & diglycerol & oligoglycerol mixture*** | 58 parts of citric acid | 5 parts of HPS* | 10.2 parts of TTAB/SDS** | 66% | +++++ |

Figure 2:
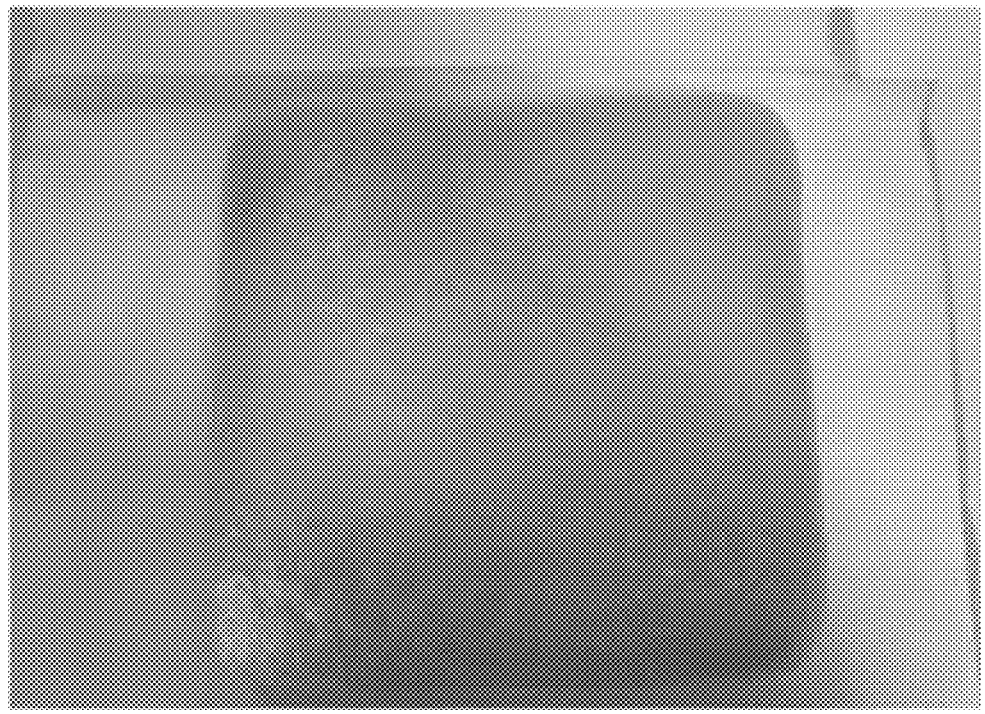
FIG. 2 shows a block of foam obtained in accordance with the present invention.

*sodium hypophosphite hydrate
**tetradecyltrimethylammonium bromide (TTAB) and sodium dodecyl sulfate (SDS) added in the form of 25% solution in water; TTAB/SDS weight ratio = 2
***mixture containing around a third of each of the components
**polyglycerol-4 (CAS no. 25618-55-7) contains around 2% diglycerol, 43% triglycerol, 34% tetraglycerol, 14% pentaglycerol, 6% hexaglycerol The foams obtained all have a fine and uniform porous structure. They are of ivory or beige color. FIGS. 1 and 2** show, by way of example, respectively a slab and a block of foam obtained. These tests show that the combined use of an esterification catalyst (sodium hypophosphite) and of a surfactant (cationic and anionic surfactant combination) makes it possible to obtain, foams in a single high-temperature step.

The test using polyglycerol-4 as polyol component appears to indicate that the foaming is inhibited by the absence of glycerol monomer and the virtual absence of dimer. The presence of a certain amount of glycerol monomer and/or dimer appears to be important for the foaming.

The alkyl polyglycosides (neutral surfactants) give results comparable to the TTAB/SDS combination.

The Applicant carried out tests with an anionic surfactant (Disponil® SUS 87 Spez.; disodium salt of an ethoxylated decyl alcohol ester), but this surfactant, used in the absence of a cationic surfactant, does not make it possible to obtain a foam.

The use of a nonionic surfactant having an HLB of 14 (Disponil® PGE 110; polyglycolic diether of an aliphatic diol) does not result in a foam being obtained either.

Replacement of a Portion of the Glycerol by Other Polyols

Table 2 below shows the results obtained by tests carried out under the same conditions as those of table 1. Around a third of the glycerol/diglycerol/oligoglycerol was replaced by a different polyol (hydrophobic starch, trimethylolpropane, pentaerythritol).

TABLE 2

| Polyol | Polyacid | Catalyst | Surfactant | Solids content | Thickness of the foam |
|---|---|---|---|---|---|
| 24 parts of glycerol + 10 parts of hydrophobic starch | 66 parts of citric acid | 5 parts of HPS* | 5.1 parts of TTAB/SDS** | 66% | +++++ |
| 24 parts of glycerol + 10 parts of trimethylolpropane | 66 parts of citric acid | 5 parts of HPS* | 5.1 parts of TTAB/SDS** | 66% | +++++ |
| 24 parts of glycerol + 10 parts of pentaerythritol | 66 parts of citric acid | 5 parts of HPS* | 5.1 parts of TTAB/SDS** | 66% | +++++ |

*sodium hypophosphite hydrate
**tetradecyltrimethylammonium bromide (TTAB) and sodium dodecyl sulfate (SDS) added in the form of 25% solution in water; TTAB/SDS weight ratio = 2

It can be observed that this partial replacement of the glycerol or of oligomers thereof in no way impairs the quality of the foams formed.

Total Replacement of Glycerol by Other Polyols

Table 3 below shows the results obtained by tests carried out under the same conditions as those of table 1, with the exception that all of the glycerol/diglycerol/oligoglycerol was replaced by a different polyol (hydrophobic starch, maltitol, isosorbide).

TABLE 3

| Polyol | Polyacid | Catalyst | Surfactant | Solids content | Thickness of the foam |
|---|---|---|---|---|---|
| 34 parts of EmCap ®*** | 66 parts of citric acid | 5 parts of HPS* | 5.1 parts of TTAB/SDS** | 66% | — |
| 48 parts of maltitol | 52 parts of citric acid | 5 parts of HPS* | 5.1 parts of TTAB/SDS** | 66% | — |
| 54 parts of isosorbide | 46 parts of citric acid | 5 parts of HPS* | 5.1 parts of TTAB/SDS** | 66% | — |

*sodium hypophosphite hydrate
**tetradecyltrimethylammonium bromide (TTAB) and sodium dodecyl sulfate (SDS) added in the form of 25% solution in water; TTAB/SDS weight ratio = 2
***hydrophobic modified starch It is observed that the total replacement of the glycerol or oligomers thereof prevents the formation of foams. The presence of glycerol, diglycerol or oligoglycerol therefore proves essential to the formation of foams.

Replacement of a Portion Or of All of the Citric Acid by Another Polyacid

Table 4 below shows the results obtained by tests carried out under the same conditions as those of table 1, with the exception that a portion or all of the citric acid was replaced by another polyacid.

TABLE 4

| Polyol | Polyacid | Catalyst | Surfactant | Solids content | Foam thickness |
|---|---|---|---|---|---|
| 42 parts of a glycerol & diglycerol & oligoglycerol mixture | 58 parts of tricarballylic acid | 5 parts of HPS* | 5 parts of APG*** | 66% | — |
| 42 parts of a glycerol & diglycerol & oligoglycerol mixture | 58 parts of 1,2,3,4-tetrabutylcarboxylic acid | 5 parts of HPS* | 5 parts of APG*** | 66% | — |
| 42 parts of a glycerol & diglycerol & oligoglycerol mixture | 58 parts of itaconic acid | 5 parts of HPS* | 5 parts of APG*** | 66% | — |
| 34 parts of glycerol | 56 parts of citric acid + 10 parts of 1,2,3,4-tetrabutylcarboxylic acid | 5 parts of HPS* | 5.1 parts of TTAB/SDS** | 66% | +++++ |
| 34 parts of glycerol | 56 parts of citric acid + 10 parts of nonadioic acid | 5 parts of HPS* | 5.1 parts of TTAB/SDS** | 66% | +++++ |

*sodium hypophosphite
**tetradecyltrimethylammonium bromide (TTAB) and sodium dodecyl sulfate (SDS) added in the form of 25% solution in water; TTAB/SDS weight ratio = 2
***($C_8$-$C_{14}$)alkyl polyglycoside (Glucopon 650 EC) added in the form of an aqueous solution having 52% by weight of solids It is observed that the total replacement of the citric acid by other polyacids prevents the formation of foams. The partial replacement of citric acid does not impair the quality of the foams.

Esterification Catalyst

When a test is carried out under the same conditions as those of table 1 but omitting the sodium hypophosphite, the formation of foam is very greatly inhibited.

TABLE 5

| Polyol | Polyacid | Catalyst | Surfactant | Solids content | Foam thickness |
|---|---|---|---|---|---|
| 34 parts of glycerol | 66 parts of citric acid | — | 5.1 parts of TTAB/SDS* | 66% | + |

*tetradecyltrimethylammonium bromide (TTAB) and sodium dodecyl sulfate (SDS) added in the form of 25% solution in water; TTAB/SDS weight ratio = 2

Thermogravimetric analysis (TGA) tests for an aqueous solution of citric acid containing sodium hypophosphite, in comparison with an identical solution without sodium hypophosphite, showed that the sodium hypophosphite catalyzes the decomposition of the citric acid to give aconitic acid and $CO_2$.

The invention claimed is:

1. A process for manufacturing a thermoset polyester foam, comprising the following successive steps:
    (a) providing an expandable and thermosetting composition containing
        a polyol component comprising at least one element selected from glycerol, diglycerol and glycerol oligomers, a polyacid component comprising citric acid, a surfactant selected from alkyl polyglycosides and the mixtures of an anionic surfactant and a cationic surfactant, and an esterification catalyst, (b) introducing the expandable and thermosetting composition into a mold or applying the expandable composition to a support, and (c) heating the expandable and thermosetting composition at a temperature at least equal to 135° C. so as to react the polyol component with the polyacid component and form a block of thermoset polyester foam.

2. The process as claimed in claim 1, wherein the polyol component and the polyacid component represent together at least 60% of the dry weight of the expandable and thermosetting composition.

3. The process as claimed in claim 1, wherein the polyol component comprises at least 15% by weight of glycerol.

4. The process as claimed in claim 1, wherein the polyacid component comprises at least 50% by weight of citric acid.

5. The process as claimed in claim 1, wherein the surfactant as a mixture of sodium dodecyl sulfate (SDS) and tetradecyltrimethylammonium bromide (TTAB).

6. The process as claimed in claim 1, wherein the surfactant has a hydrophilic-lipophilic balance (HLB) of between 3 and 13.

7. The process as claimed in claim 1, wherein the polyol component represents from 15% to 60% by weight of the total weight of the polyol and polyacid components.

8. The process as claimed in claim 1, wherein the expandable and thermosetting composition contains at most 60% by weight of water.

9. The process as claimed in claim 1, wherein the esterification catalyst is selected from phosphorus-containing compounds.

10. The process as claimed in claim 1, wherein the expandable composition also contains up to 30% by weight relative to the dry weight of the total expandable composition, of one or more inorganic or organic fillers.

11. A composition, comprising:

a polyol component comprising at least one element selected front glycerol, diglycerol and glycerol oligomers;

a polyacid component comprising citric acid;

a surfactant selected from alkyl polyglycosides and the mixtures of an anionic surfactant and a cationic surfactant; and an esterification catalyst, wherein the composition is an expandable and thermosetting composition for the manufacture of an insulating product of foam type.

12. The process as claimed in claim 1, wherein the temperature at which the expandable and thermosetting composition is heated is at least equal to 150° C.

13. The process as claimed in claim 1, wherein the polyol component and the polyacid component represent together at least 80% of the dry weight of the expandable and thermosetting composition.

14. The process as claimed in claim 1, wherein the polyol component comprises at least 25% by weight of glycerol.

15. The process as claimed in claim 1, wherein the polyacid component comprises at least 80% by weight of citric acid.

16. The process as claimed in claim 1, wherein the polyol component represents from 25% to 45% by weight of the total weight of the polyol and polyacid components.

* * * * *